(12) United States Patent
Shiiyama

(10) Patent No.: US 6,567,551 B2
(45) Date of Patent: *May 20, 2003

(54) IMAGE SEARCH APPARATUS AND METHOD, AND COMPUTER READABLE MEMORY

(75) Inventor: Hirotaka Shiiyama, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,960

(22) Filed: Apr. 26, 1999

(65) Prior Publication Data

US 2002/0181783 A1 Dec. 5, 2002

(30) Foreign Application Priority Data

Apr. 27, 1998 (JP) ............................................ 10-117315
Apr. 28, 1998 (JP) ............................................ 10-118741

(51) Int. Cl.[7] ................................................. G06K 9/64
(52) U.S. Cl. ....................... 382/217; 382/218; 382/305; 707/3; 707/6; 707/102
(58) Field of Search ................................ 382/305–306, 382/217–218; 707/3, 6, 102

(56) References Cited

U.S. PATENT DOCUMENTS

| 2,685,451 | A | | 8/1954 | Greenwalt | |
| 6,026,411 | A | * | 2/2000 | Delp | 707/104 |
| 6,182,069 | B1 | * | 1/2001 | Niblack et al. | 707/6 |
| 6,247,009 | B1 | | 6/2001 | Shiiyama et al. | 707/3 |
| 6,345,274 | B1 | * | 2/2002 | Zhu et al. | 707/5 |
| 6,400,853 | B1 | | 6/2002 | Shiiyama | 382/305 |

FOREIGN PATENT DOCUMENTS

JP      1-103735      4/1989

OTHER PUBLICATIONS

U.S. application No. 09/122,700, filed Jul. 27, 1998.

* cited by examiner

Primary Examiner—Bhavesh Mehta
Assistant Examiner—Gregory Desire
(74) Attorney, Agent, or Firm—Fitzpatrick, Cella, Harper & Scinto

(57) ABSTRACT

Image data and their image feature amounts are managed in correspondence with each other using an image storage unit and an information management DB. A desired one of query conditions each of which is defined by image feature amounts set with ambiguity levels is designated by an input unit. A matching unit matches the image feature amounts that define the designated query condition, with corresponding managed image data. Image data as search results are output to a display on the basis of the matching results.

26 Claims, 18 Drawing Sheets

FIG. 6

| QUERY CONDITION | COLOR TONE | COMPOSITION | TEXTURE |
|---|---|---|---|
| SEARCH FOR COLOR TONE AND SHAPE STRICTLY | 0 | 0 | 100 |
| SEARCH FOR COLOR TONE AND SHAPE WITH CERTAIN AMBIGUITY | 20 | 20 | 100 |
| SEARCH FOR COLOR TONE ALONE STRICTLY | 10 | 100 | 100 |
| SEARCH FOR COLOR TONE ALONE WITH CERTAIN AMBIGUITY | 30 | 100 | 100 |
| SEARCH FOR COLOR TONE AND PATTERN STRICTLY | 0 | 100 | 0 |
| SEARCH FOR PATTERN ALONE STRICTLY | 100 | 100 | 0 |

FIG. 10

| IMAGE FEATURE AMOUNT ID | AVERAGE | VARIANCE |
|---|---|---|
| 1 (COLOR) | 520 | 60 |
| 2 (COMPOSITION) | 50 | 35 |

FIG. 11

| INFORMATION ID | IMAGE FEATURE AMOUNT 1 | IMAGE FEATURE AMOUNT 2 | INFORMATION STORAGE ADDRESS |
|---|---|---|---|
| 1 | 10,20,30 | 50 | C:¥¥img¥¥img001.jpg |
| 2 | 50,20,50 | 65 | C:¥¥img¥¥img002.jpg |
| 3 | 70,20,10 | 23 | C:¥¥img¥¥img031.jpg |

FIG. 19

| COLOR NAME | WAVELENGTH nm |
|---|---|
| RED | 680 |
| ORANGE | 630 |
| YELLOW | 570 |
| YELLOWISH GREEN | 530 |
| ⋮ | |

# IMAGE SEARCH APPARATUS AND METHOD, AND COMPUTER READABLE MEMORY

BACKGROUND OF THE INVENTION

The present invention relates to an image search apparatus and method for managing image data, and searching the managed image data for desired image data, and a computer readable memory.

In a conventional image search apparatus that manages attribute information and image feature amounts of image data, image search for retrieving desired image data is done by designating numerical values corresponding to weights for a plurality of pieces of attribute information and image feature amounts using a user interface and matching the attribute information and image feature amount of query image data as an example image with those of stored images. However, it is troublesome for a user who has little knowledge of images to designate weights of the image feature amounts of image data. If the user makes wrong designation, unwanted search results may be obtained as matches.

A similar image search apparatus described in, e.g., U.S. Pat. No. 2,685,456 as a conventional image search apparatus, is characterized in that "one of attribute information similarity sets that indicate image features is selected in accordance with the user or the use purpose, and similarity between images is determined using inter-attribute information similarity of the selected set". Note that the "attribute information" essentially indicates a keyword assigned in advance, and "the inter-attribute information similarity set" indicates a conceptual distance between assigned keywords. The conceptual distance is also assigned to quantitative language expressions such as "large", "small, and the like, and the one suitable for search is selected from a plurality of variations of tables which define such conceptual distances between keywords, i.e., similarity sets.

The aforementioned similar image search apparatus is characterized in that "the apparatus further has importance definition means for defining a plurality of levels of importance for each of similarity discrimination items as attribute information items required for discriminating similarity in accordance with the user or use purpose, and discriminates similarity between images using the inter-attribute information similarity selected in accordance with the user or use purpose and the importance". This characteristic feature amounts to weighting the conceptual distance between the keywords.

However, the conventional image search apparatus is not easy for the user to use, since annotation of, e.g., keywords and the like is mandatory, and there is no concept that deals with ambiguity of search.

Most of the aforementioned image search processes execute matching using distance on a given distance space mainly by multivariate analysis of statistical processes as a matching method, and coordinate components that pertain to attribute information and image feature amounts are weighted.

In this way, image search methods that designate numerical values corresponding to weights of a plurality of pieces of attribute information and image feature amounts using a user interface use basically the same scheme in relation to the matching method since they use geometric distance of a weight on a given image feature space.

When the attribute information and image feature amount of search target image data are matched using the weighted attribute information and image feature amounts, ambiguity levels upon matching may be set for each attribute information and image feature amount in some methods.

However, it is not easy for the user to correctly understand the reason why the ambiguity levels of each attribute information and image feature amount are designated upon matching in addition to numerical values corresponding to weights.

SUMMARY OF THE INVENTION

The present invention has been made in consideration of the above-mentioned problems, and has as its first object to provide an image search apparatus and method which can easily search for desired image data, and a computer readable memory.

It is the second object of the present invention to provide an image search apparatus and method which can easily designate an interest level with respect to the query condition used upon searching image data, and a computer readable memory.

In order to achieve the first object, an image search apparatus according to the present invention comprises the following arrangement.

That is, an image search apparatus for managing image data, and searching the managed image data for desired image data, comprises:

management means for managing image data and image feature amounts thereof in correspondence with each other;

designation means for designating a desired one of query conditions each of which is defined by image feature amounts set with ambiguity levels;

matching means for matching the image feature amounts that define the query condition designated by the designation means, with corresponding image feature amounts of image data managed by the management means; and output means for outputting image data as search results on the basis of matching results of the matching means.

In order to achieve the first object, an image search method according to the present invention comprises the following arrangement.

That is, an image search method for managing image data, and searching the managed image data for desired image data, comprises:

the management step of managing image data and image feature amounts thereof in a storage medium in correspondence with each other;

the designation step of designating a desired one of query conditions each of which is defined by image feature amounts set with ambiguity levels;

the matching step of matching the image feature amounts that define the query condition designated in the designation step, with corresponding image feature amounts of image data managed in the storage medium; and the output step of outputting image data as search results on the basis of matching results in the matching step.

In order to achieve the first object, a computer readable memory according to the present invention comprises the following arrangement.

That is, a computer readable memory that stores program codes of an image search process for managing image data, and searching the managed image data for desired image data, comprises:

a program code of the management step of managing image data and image feature amounts thereof in a storage medium in correspondence with each other;

a program code of the designation step of designating a desired one of query conditions each of which is defined by image feature amounts set with ambiguity levels;

a program code of the matching step of matching the image feature amounts that define the query condition designated in the designation step, with corresponding image feature amounts of image data managed in the storage medium; and a program code of the output step of outputting image data as search results on the basis of matching results in the matching step.

In order to achieve the second object, an image search apparatus according to the present invention comprises the following arrangement.

That is, an image search apparatus for managing image data, and searching the managed image data for desired image data, comprises:

management means for managing image data, and attribute information and image feature amounts thereof in correspondence with each other;

designation means for designating the attribute information and image feature amounts, and interest levels for the attribute information and image feature amounts as a query condition used in a search of image data;

matching means for matching the attribute information and image feature amounts that define the query condition designated by the designation means, with corresponding attribute information and image feature amounts of image data managed by the management means, on the basis of the interest levels; and output means for outputting image data as search results on the basis of matching results of the matching means.

In order to achieve the second object, an image search method according to the present invention comprises the following arrangement.

That is, an image search method for managing image data, and searching the managed image data for desired image data, comprises:

the management step of managing image data, and attribute information and image feature amounts thereof in a storage medium in correspondence with each other;

the designation step of designating the attribute information and image feature amounts, and interest levels for the attribute information and image feature amounts as a query condition used in a search of image data;

the matching step of matching the attribute information and image feature amounts that define the query condition designated in the designation step, with corresponding attribute information and image feature amounts of image data managed in the storage medium in the management step, on the basis of the interest levels; and the output step of outputting image data as search results on the basis of matching results in the matching step.

In order to achieve the second object, a computer readable memory according to the present invention comprises the following arrangement.

That is, a computer readable memory that stores program codes of an image search process for managing image data, and searching the managed image data for desired image data, comprises:

a program code of the management step of managing image data, and attribute information and image feature amounts thereof in a storage medium in correspondence with each other;

a program code of the designation step of designating the attribute information and image feature amounts, and interest levels for the attribute information and image feature amounts as a query condition used in a search of image data;

a program code of the matching step of matching the attribute information and image feature amounts that define the query condition designated in the designation step, with corresponding attribute information and image feature amounts of image data managed in the storage medium in the management step, on the basis of the interest levels; and a program code of the output step of outputting image data as search results on the basis of matching results in the matching step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows an example of a table that expresses the correspondence between the query condition list and ambiguity level in the first embodiment;

FIG. 10 is a table showing an example of data used for normalizing an image feature amount in the first embodiment;

FIG. 11 is a table showing an example of the data format recorded in the image management DB in the first embodiment;

FIG. 19 shows an example of a table used for numerically expressing attribute information in the second embodiment;

DESCRIPTION OF THE PREFERRED EMBODIMENTS

First Embodiment

Figure 1:
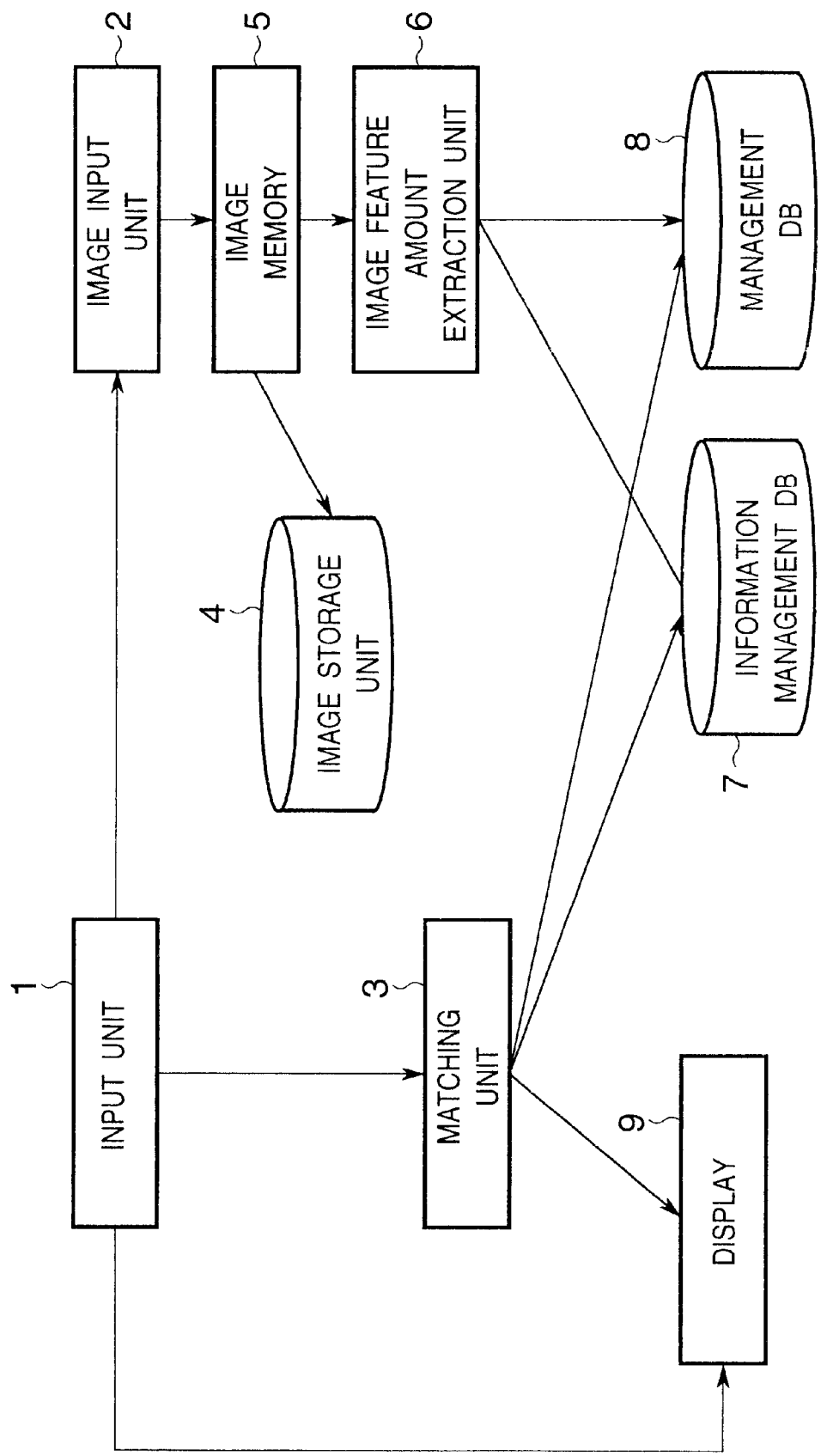
FIG. 1 is a block diagram showing the arrangement of an image search apparatus according to the first embodiment of the present invention.

FIG. 1 is a block diagram showing the arrangement of an image search apparatus according to the first embodiment.

Referring to FIG. 1, reference numeral 1 denotes an input unit which includes a keyboard and mouse. Reference numeral 4 denotes an image storage unit which saves image data temporarily stored in an image memory 5. Reference numeral 2 denotes an image input unit for inputting image data to be registered in the image storage unit 4. Reference numeral 5 denotes the image memory for temporarily storing image data input by the image input unit 2. Reference numeral 6 denotes an image feature amount extraction unit which acquires attribute information indicating attributes (such as image, text, and the like) of the input image data. The unit 6 also extracts and normalizes image feature amounts of that image data. Note that this normalization is done upon matching to obtain the averages and variances of image feature amounts under identical conditions in discussing distance relating to data with quite different natures with respect to the computed image feature amounts. Data (averages and variances) used in normalization are saved in the storage area of the system upon introduction, and have a format shown in, e.g., FIG. 10.

Reference numeral 7 denotes an information management database (DB) which registers the image feature amounts and attribute information of image data extracted by the image feature amount extraction unit 6 in correspondence with that image data. Note that attribute information may be separately stored in a management database (DB) 8. Reference numeral 3 denotes a matching unit which executes matching between image feature amounts defined by a query condition and the corresponding image feature amounts of search target image data to obtain a coincidence level. Reference numeral 9 denotes a display which displays image data obtained by the matching unit 3 as a search result. Also, the display 9 displays a user interface used by the user to designate desired ambiguity level with respect to a query condition.

The registration process for registering image data will be explained below with reference to FIG. 2.

Figure 2:
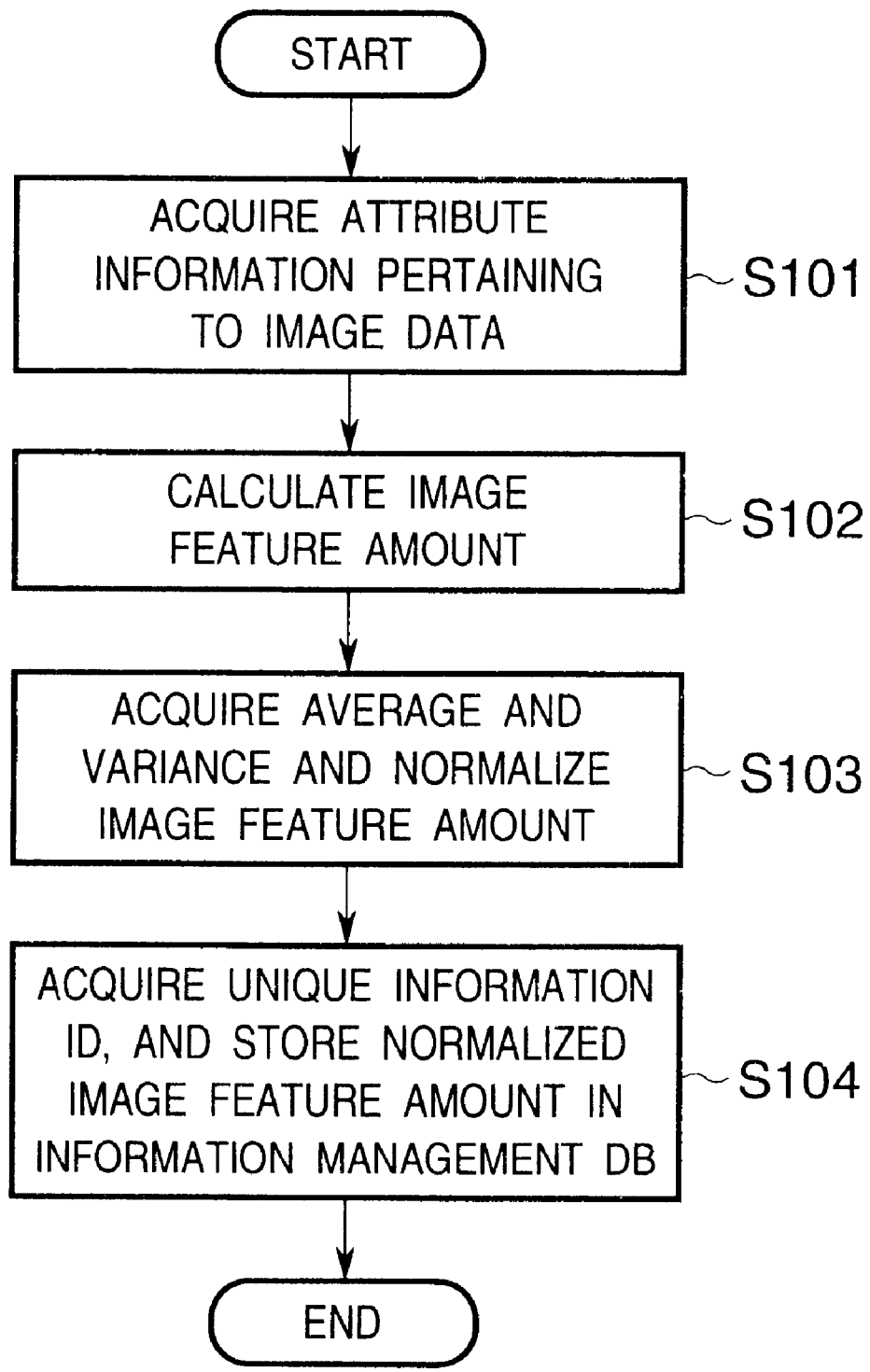
FIG. 2 is a flow chart showing an image data registration process executed in the first embodiment.

FIG. 2 is a flow chart showing the image data registration process executed in the first embodiment.

Figure 3:
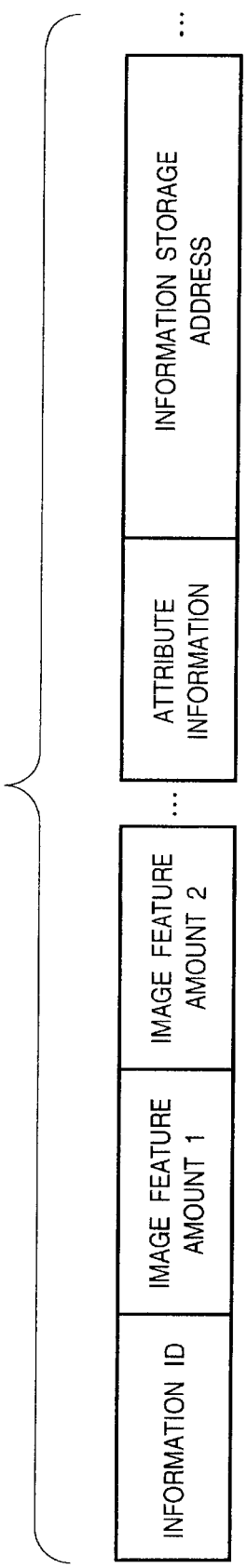
FIG. 3 shows the data format recorded in an information management DB in the first embodiment.

In step S101, attribute information of input image data is acquired. In step S102, the image feature amounts of the input image data are computed. In step S103, data (average and variance) for normalizing the image data are acquired from the storage area of the system, and the image feature amounts are normalized on the basis of the acquired data. In step S104, an information ID indicating the input image data, the normalized feature amounts, the acquired attribute information, and an information storage address indicating the location where that image data is actually managed are stored in the information management DB 7 in correspondence with each other in, e.g., a format shown in FIG. 3.

The search process for retrieving image data will be explained below with reference to FIG. 4.

Figure 4:
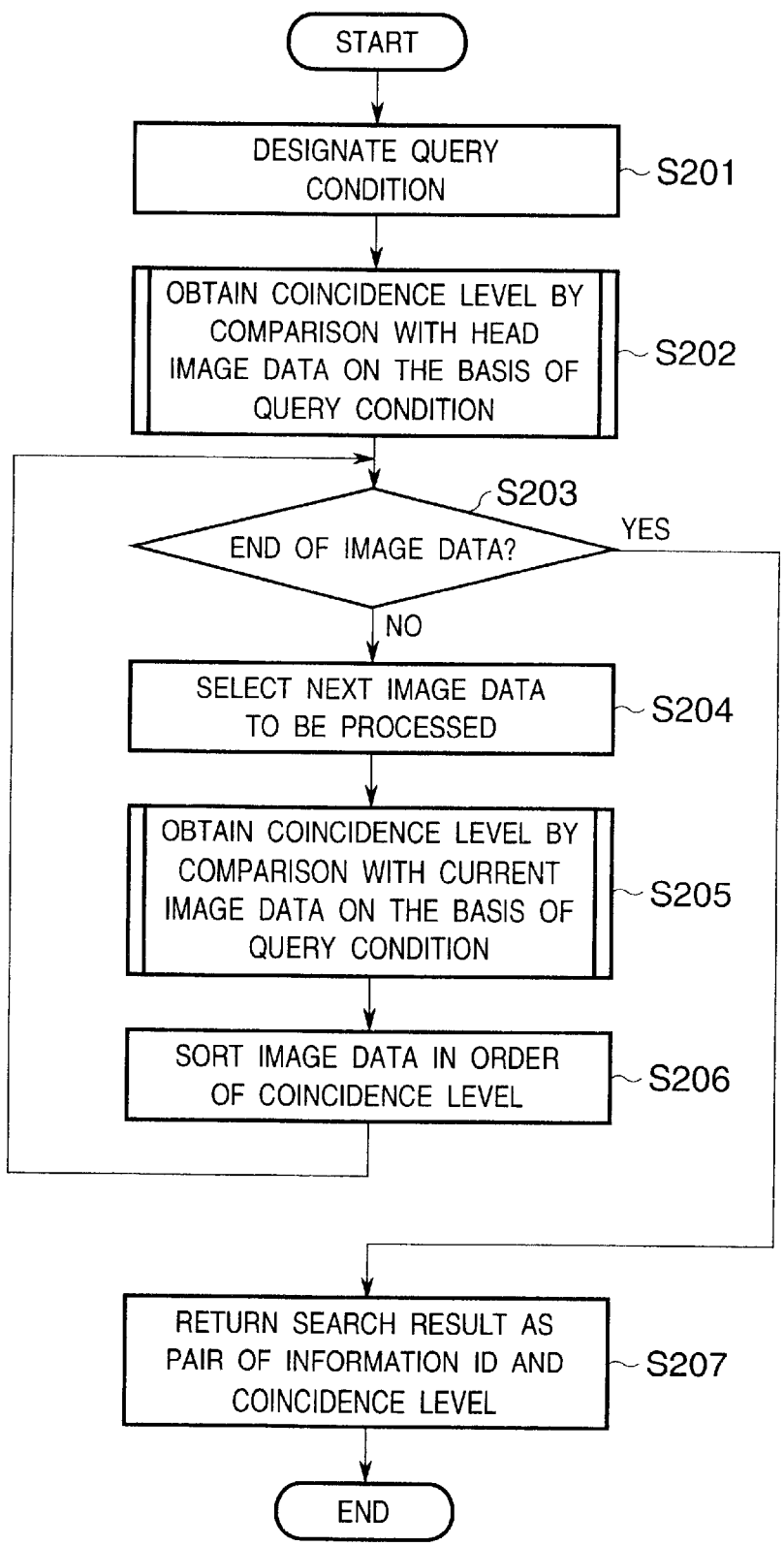
FIG. 4 is a flow chart showing an image data search process executed in the first embodiment.

FIG. 4 is a flow chart showing the image data search process executed in the first embodiment.

In step S201, a query condition list used for selecting a query condition is displayed on the display 9 to prompt the user to select a desired query condition from the query condition list. As the query condition, coordinates on the same normalized multi-dimensional image feature space as that upon registration are given. For example, when image data similar to a given image is to be retrieved, the normalized image feature amount of that image data is given.

Figure 5A:
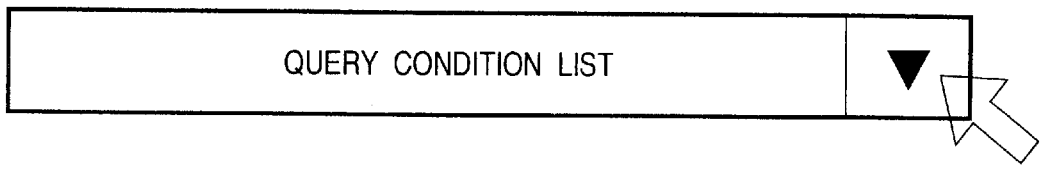
FIGS. 5A and 5B show an example of a user interface used for designating a query condition in the first embodiment.
Figure 5B:
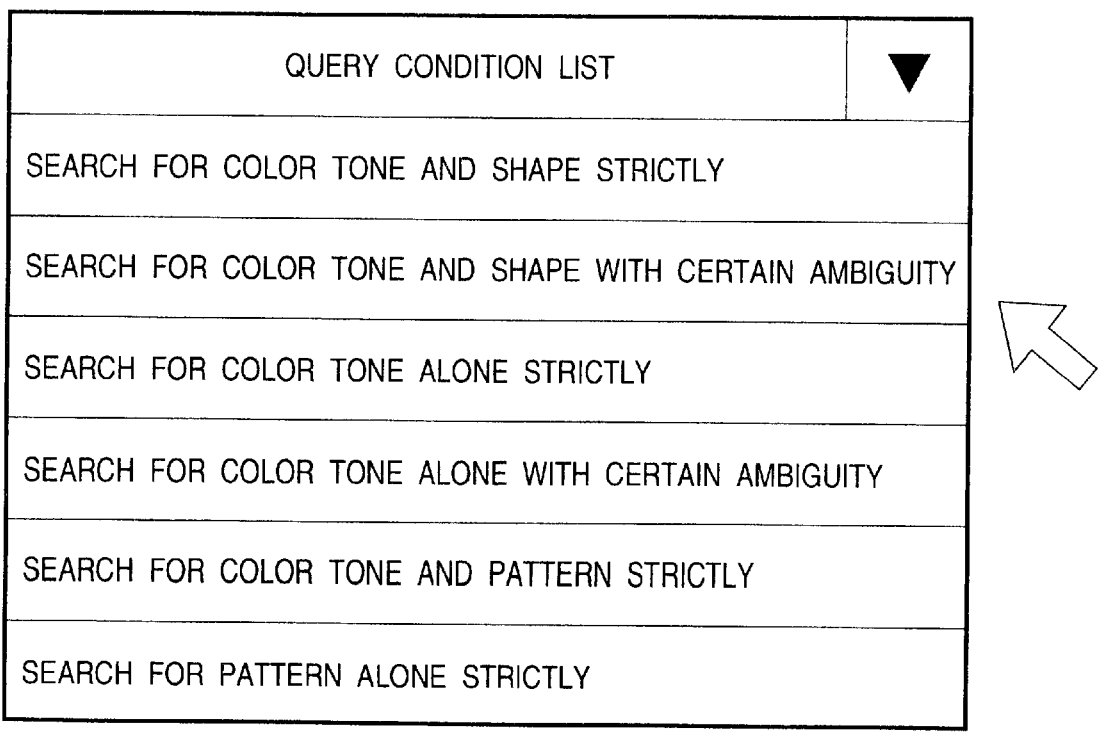

As an example of operation upon selecting the query condition, a button for instructing display of the query condition list shown in FIG. 5A is displayed on the display 9. When the user clicks that button using the mouse or the like of the input unit 1, the query condition list shown in FIG. 5B is displayed. The user then selects a desired query condition from the query condition list using a cursor on the display 9, which is controlled by the mouse of the input unit 1. In the example shown in FIG. 5B, the query condition list that includes query conditions using three image feature amounts or signatures, i.e., color tone, composition, and texture is presented. FIG. 6 shows the correspondence between each query condition and the ambiguity levels set for image feature amounts which define the corresponding query condition. The ambiguity level indicates a higher level as it assumes a larger value. When a query condition is selected from already registered image data, since the normalized image feature amounts of that image data have already been managed by the information management DB 7 upon registration, they can be used.

Note that the most standard query condition may be set and displayed as a default condition, and the query condition list may be displayed only when the user wants to select a query condition other than such default condition. On the other hand, the query condition selected by the user may be held until a series of search processes end, and a default query condition may be set when he or she starts a new search process. Furthermore, upon completion of the search process, the query condition selected may be stored as a profile, and when the user starts a new search process, the query condition stored in that profile may be set. When the system can manage login users, profiles may be managed in units of users, and the query condition previously selected by a user who is about to start the search process may be set.

In step S202, the matching unit 3 matches normalized feature amounts that define the selected query condition, with those of image data stored at the head of the image storage unit 4. More specifically, matching between normalized image feature amounts (the normalized image feature amounts will also be referred to as normalization parameters hereinafter) is done in accordance with the aforementioned ambiguity levels, and the matching result is determined as similarity of that normalized parameter of interest. The computation formula of similarity may be changed or constraint condition may be made stricter or weaker in correspondence with the ambiguity level. Using the obtained similarities in units of normalization parameters, a coincidence level L between the normalized image feature amount of image data to be processed and the one which defines the query condition is computed. Especially, assuming that image feature amounts have no correlation, the coincidence level L can be computed by:

$$L = \frac{\sum_{i=1}^{k} \{Si(Fi, Ri, Pi)\}}{\sum_{i=1}^{k} (Fi)} \times 100[\%] \quad (1.0)$$

where
- i: an identifier of the image feature amount;
- k: the number of types of normalization parameters;
- Pi: a normalization parameter;
- Ri: a comparison reference parameter (the normalization parameter of image data to be matched);
- Fi: a function of obtaining the ambiguity level for the image feature amount i;
- Si(Fi, Ri, Pi): a function of obtaining similarity between the comparison reference parameter Ri and normalization parameter Pi in consideration of the ambiguity level Fi for the image feature amount i; the value ranges from 0 to Xi(Fi), and 100% matching yields Xi(Fi); and
- Xi(Fi): a function of determining the upper limit (full marks) of Si(Fi, Ri, Pi) with respect to the ambiguity level Fi for the parameter i.

Figure 7:
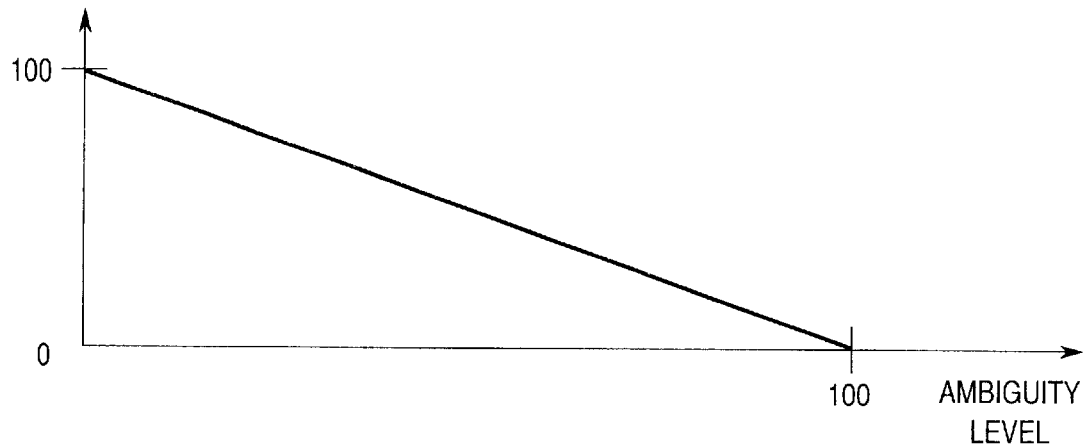
FIG. 7 is a graph showing an example of Xi(Fi) in the first embodiment.

As can be seen from the above equation, as the ambiguity level of computation rises, the goodness of the match lowers and the upper limit of the coincidence level L in that computation lowers. Hence, Xi(Fi) is a monotonously decreasing function of Fi. FIG. 7 shows an example of Xi(Fi). Note that Xi(Fi) is not particularly limited as long as it is a monotonously decreasing function.

The process for obtaining the coincidence level L in step S202 will be described in detail below with reference to FIG. 8.

Figure 8:
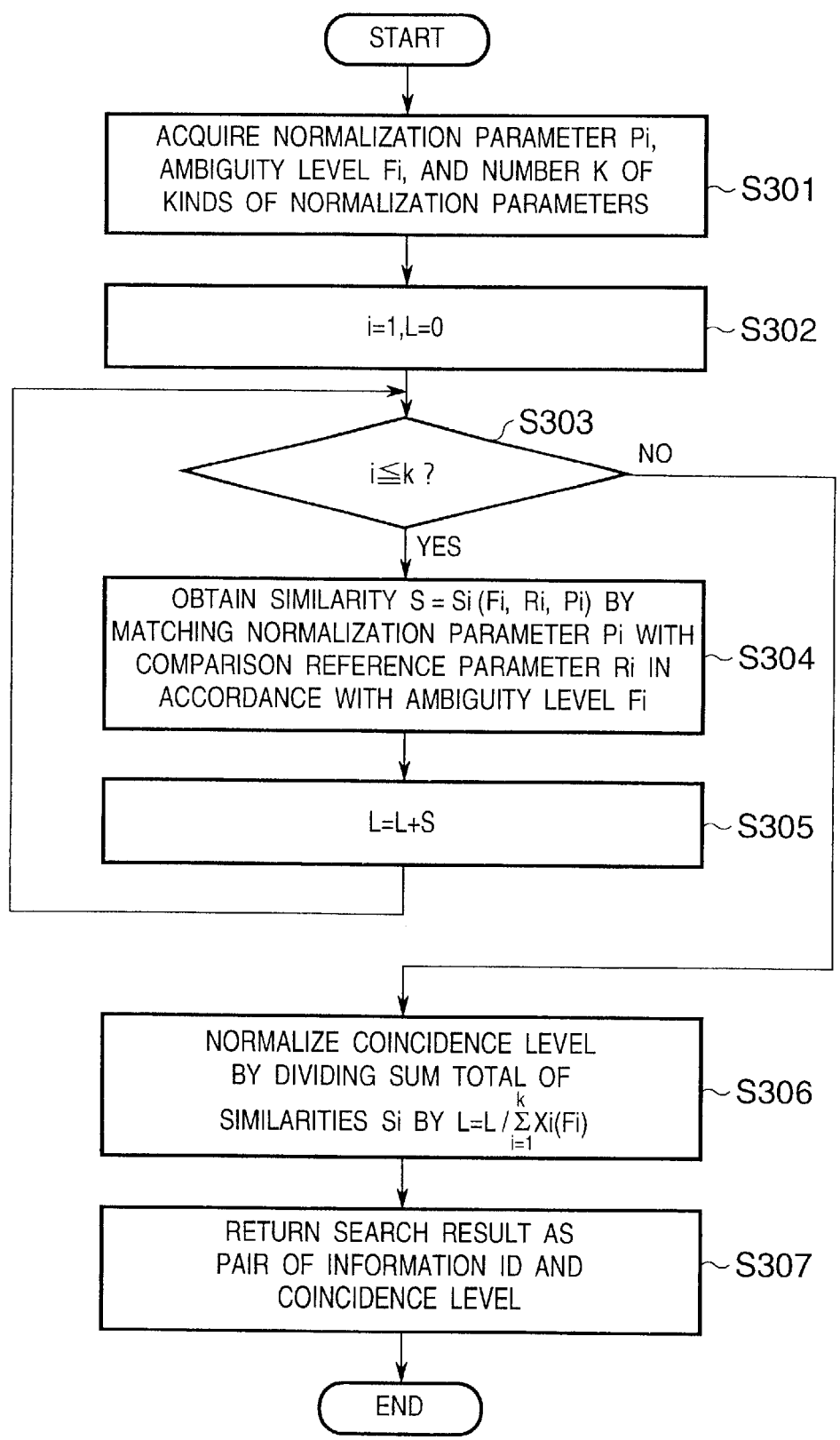
FIG. 8 is a flow chart showing the details of the process executed in step S202 in FIG. 4 in the first embodiment.

FIG. 8 is a flow chart showing the details of the process executed in step S202 in FIG. 4 in the first embodiment.

In step S301, the normalization parameters Ri that define the query condition, their ambiguity level Fi, and the number k of kinds of normalization parameters are acquired. In step S302, the value of counter i for counting the normalization parameters that have undergone matching is set at 1, and the value (coincidence level) of register L is set at 0. It is checked in step S303 if the value of counter is equal to or smaller than the number k of kinds of normalization parameters. If the value of counter i is equal to or smaller than the number k of kinds of normalization parameters (YES in step S303), the flow advances to step S304, and matching between the normalization parameter Pi and comparison reference parameter Ri is done using the ambiguity level Fi to obtain similarity S=Si(Fi, Ri, Pi). The obtained similarity S is added to the current value of register L.

On the other hand, if the value of counter i is larger than the number k of kinds of normalization parameters (NO in step S303), the flow advances to step S306, and the sum total of similarities Si is divided by the value of register L to obtain a normalized coincidence level L. In step S307, a pair of the obtained coincidence level L and the information ID of image data to be matched are output as a search result.

The following description will be given referring back to FIG. 4.

It is checked in step S203 if image data to be matched are exhausted. If image data to be matched are exhausted (YES in step S203), the flow advances to step S207, and pairs of the information IDs of image data and the coincidence levels L with the query condition are output to the display 9 as search results. On the other hand, if image data to be matched are not exhausted (NO in step S203), the flow advances to step S204 to select the next image data to be matched.

In step S205, normalized image feature amounts that define the query condition are matched with those of that image data by the matching unit 3. Since the details of this process are the same as those in step S202, a detailed description thereof will be omitted. In step S206, image data that have finished matching in the matching unit 3 are sorted on the basis of the obtained coincidence levels L, and the flow returns to step S203. If it is determined in step S203 that image data to be matched are exhausted, the flow advances to step S207, and the pairs of information IDs of image data and the coincidence levels L with the query condition are output to the display 9 as search results in descending order of coincidence level L.

In the aforementioned search process, presearch may be done to shorten the processing time. That is, image data having coincidence levels equal to or larger than a predetermined value are extracted in advance in units of image feature amounts, and the search process is executed for those extracted image data under the actually designated query condition. In this case, similarities Si(Wi) for all normalization parameters are not always obtained. In such case, as for similarities Si(Fi, Ri, Pi) corresponding to normalization parameters i that have been excluded by the presearch, a minimum similarity value Min(Si) of the remaining search results after the presearch is used in place of Si(Fi, Ri, Pi). The search process including the presearch will be explained below with reference to FIG. 9.

Figure 9:
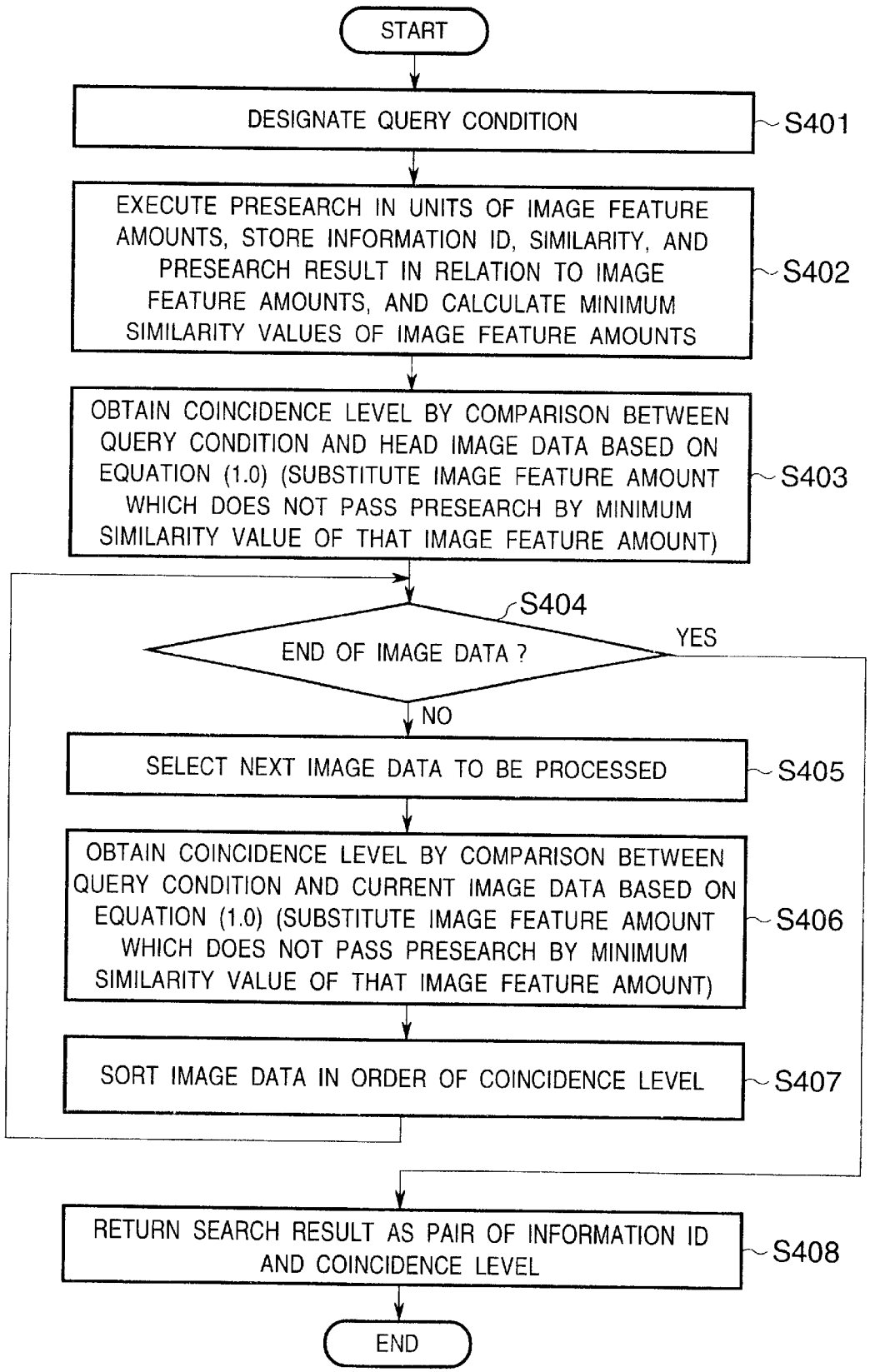
FIG. 9 is a flow chart showing a search process including presearch executed in the first embodiment.

FIG. 9 is a flow chart showing the search process including presearch executed in the first embodiment.

In step S401, a query condition list used for selecting a query condition is displayed on the display 9 to prompt the user to select a desired query condition from the query condition list. In step S402, matching with normalization parameters of image data stored in the image storage unit 4 is done as presearch by the matching unit 3 in units of normalization parameters that define the selected query condition. Then, the presearch results, information IDs, and similarities are stored in units of image data, and minimum similarity values of the individual normalization parameters are stored.

In step S403, computations given by equation (1.0) above are made for the respective normalization parameters of image data stored at the head of the image storage unit 4 to obtain a coincidence level L with the query condition. However, if normalization parameter j does not pass the presearch, the minimum similarity value of normalization parameter j stored in step S402 is substituted in terms i=j in equation (1.0). In this way, any computation results for the individual normalization parameters lost in the presearch can be compensated for, and matching can be done.

It is checked in step S404 if image data to be processed, i.e., those which are to undergo computations given by equation (1.0) are exhausted. If image data to be processed are exhausted (YES in step S404), the flow advances to step S408, and pairs of information IDs of image data and the coincidence levels L with the query condition are output to the display 9 as search results. On the other hand, if image data to be matched are not exhausted (NO in step S404), the flow advances to step S405 to select the next image data to be processed.

In step S406, computations given by equation (1.0) above are made for the respective normalization parameters of the selected image data to obtain a coincidence level L with the query condition. In step S407, image data that have been processed are sorted on the basis of the obtained coincidence levels L, and the flow then-returns to step S404. If it is determined in step S404 that image data to be processed are exhausted, the flow advances to step S408, and pairs of information IDs of image data and coincidence levels L with the query condition are output to the display 9 as search results in descending order of coincidence level L.

An example of the aforementioned registration process and search process will be explained below.

In this example, image data which is expressed by 32-bit R, G, and B values, and has a figure painted in white will be exemplified as that to be registered in the registration process.

In the registration process, as described above, the image feature amounts of image data to be registered are computed. In this case, as image feature amounts, a color represented by R, G, and B values of the image data, and a composition indicated by the painted figure of that image data are obtained.

Then, data for normalizing these image feature amounts are acquired from the table shown in FIG. 10 to obtain normalized feature amounts X, which are normalized by:

$$\text{normalized image feature amount } X = (\text{image feature amount} - \text{average})/\text{variance} \quad (2.0)$$

In this case, the R, G, and B values are normalized by a similarity computation using Si(Fi, Ri, Pi) given by equation (1.0). In this process, R, G, and B values of actual image data are used. After the image feature amount indicated by the color represented by actual R, G, and B values, and the image feature amount indicated by the composition are respectively normalized, the normalized image feature amounts are stored in the information management DB 7 in the format shown in FIG. 11. In the example shown in FIG. 11, image feature amount 1 corresponds to that indicated by the color, and image feature amount 2 is that indicated by the composition.

The search process will be explained below. In the process, assume that the user selects "search for color and shape with certain ambiguity" from the query condition list shown in FIG. 5B, and image data with an information ID=1 stored in the information management DB shown in FIG. 11 is designated as a query image.

In this case, the image feature amounts of the designated image data are normalized to obtain (10, 20, 30) as an image feature amount indicated by the color, and 50 as an image feature amount indicated by a composition. Referring to FIG. 6, the ambiguity levels in the query condition "search for color and shape with certain ambiguity" are respectively 20 for the color, and 20 for the composition.

When a coincidence level with the search target image is computed according to equation (1.0) above using these results, since the number k of kinds of image feature amounts (normalization parameters)=2, equation (1.0) can be rewritten as:

$$L = \{S1(20, (10, 20, 30), P1) + S2(20, 50, P2)\} \div 40 \quad (3.0)$$

Note that the first term $S1(20, (10, 20, 30), P1)$ in equation (3.0) computes similarity between the image feature amount (10, 20, 30) for the ambiguity level 20 and P1(R, G, B) in pattern matching that pertains to color.

If a computation corresponding to the ambiguity level 20 calculates the sum of the absolute values of the differences of the respective components, we have:

$$S1(20, (10, 20, 30)) = abs(10-r) + abs(20-g) + abs(30-b)$$

On the other hand, if a computation corresponding to the ambiguity level 20 calculates a Euclidean distance, we have:

$$S1(20, (10, 20, 30)) = sqrt(10-r)^2 + (20-g)^2 + (30-b)^2$$

Similarly, the second term (S2(20, 50, P2)) computes similarity between the image feature amount 50 for the ambiguity level 20, and P1 in pattern matching that pertains to the area of the figure.

In the similarity computations, a formula or algorithm suitable for an ambiguity level of each image feature amount is used.

The aforementioned process is done for all search target image data, and image data are sorted and displayed as search results on the display 9 in descending order of coincidence level L. When search results are returned to a host application, or are represented by a distance in place of the coincidence level L, the distance can be converted via a function that describes correspondence between the distance and coincidence level, and that function is a monotonously decreasing function.

When a search process including presearch is executed, if the difference between the image feature amount indicated by the color and the color of the corresponding image feature amount of image data to be processed falls within a predetermined range, or if the ratio of the image feature amount indicated by the composition to the area of the composition of the corresponding image feature amount of the image data to be processed falls within a predetermined range, it is determined that the image feature amount has passed the presearch. For each image data to be processed, the result indicating passing or not the presearch, information ID, and similarity are stored, and the minimum similarity values of the respective image feature amounts (normalization parameters), i.e., the minimum values of the first and second terms of equation (3.0) are stored.

Subsequently, all image data undergo computations given by equation (3.0) to obtain coincidence levels L with the query condition. In this case, image data are sorted in descending order of coincidence level L. In image data for which the image feature amount indicated by the color does not pass the presearch, the minimum value of the first term stored in advance is used in the first term in equation (3.0). On the other hand, in image data for which the image feature amount indicated by the composition does not pass the presearch, the minimum value of the second term stored in advance is used in the second term in equation (3.0).

As described above, according to the first embodiment, since the image feature amounts of image data are extracted and registered without assigning any keywords upon registering image data, automatic image data registration can be realized. Using a user interface which is easy to understand even for a user who has little knowledge of image feature amounts of image data, the ambiguity levels of image feature amounts suitable for the search purpose can be designated and set.

In the first embodiment, matching between the normalization parameter of the query condition, and that of search target image data is done to obtain their coincidence level L. Alternatively, each normalization parameter may undergo multivariate analysis to obtain its major component axis, the number of dimensions may be reduced to the number of effective major components, and matching may be done on a major component space of the reduced number of dimensions. In this case, the ambiguity level of an image feature amount (normalization parameter) must be determined depending on the major component axis. In most cases, the major component axis often becomes an axis that physically and conceptually has a given meaning, and weighting on such major component axis is more effective than in this embodiment.

Second Embodiment

Figure 12:
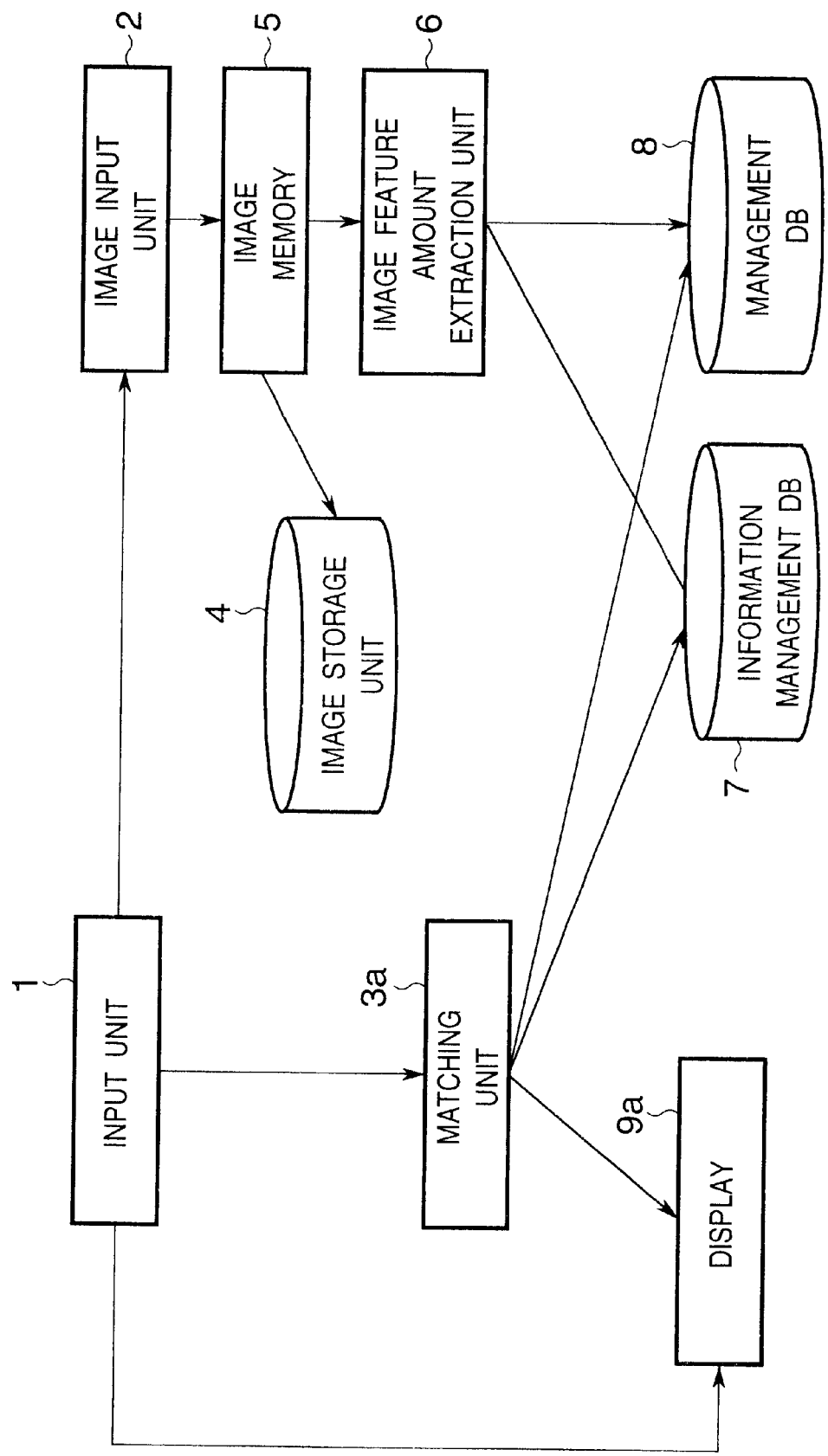
FIG. 12 is a block diagram showing the arrangement of an image search apparatus according to the second embodiment of the present invention.

FIG. 12 is a block diagram showing the arrangement of an image search apparatus according to the second embodiment.

The same reference numerals in FIG. 12 denote the same parts as those in FIG. 1 of the first embodiment, and a detailed description thereof will be omitted.

Reference numeral 3a denotes a matching unit which matches attribute information and image feature amount that define a query condition, with corresponding search target image data to obtain their coincidence level. Reference numeral 9a denotes a display for displaying image data obtained by the matching unit 3a as search results. Also, the display 9 displays a user interface used by the user to designate the interest level with respect to a query condition.

The registration process for registering image data will be described below with reference to FIG. 13.

Figure 13:
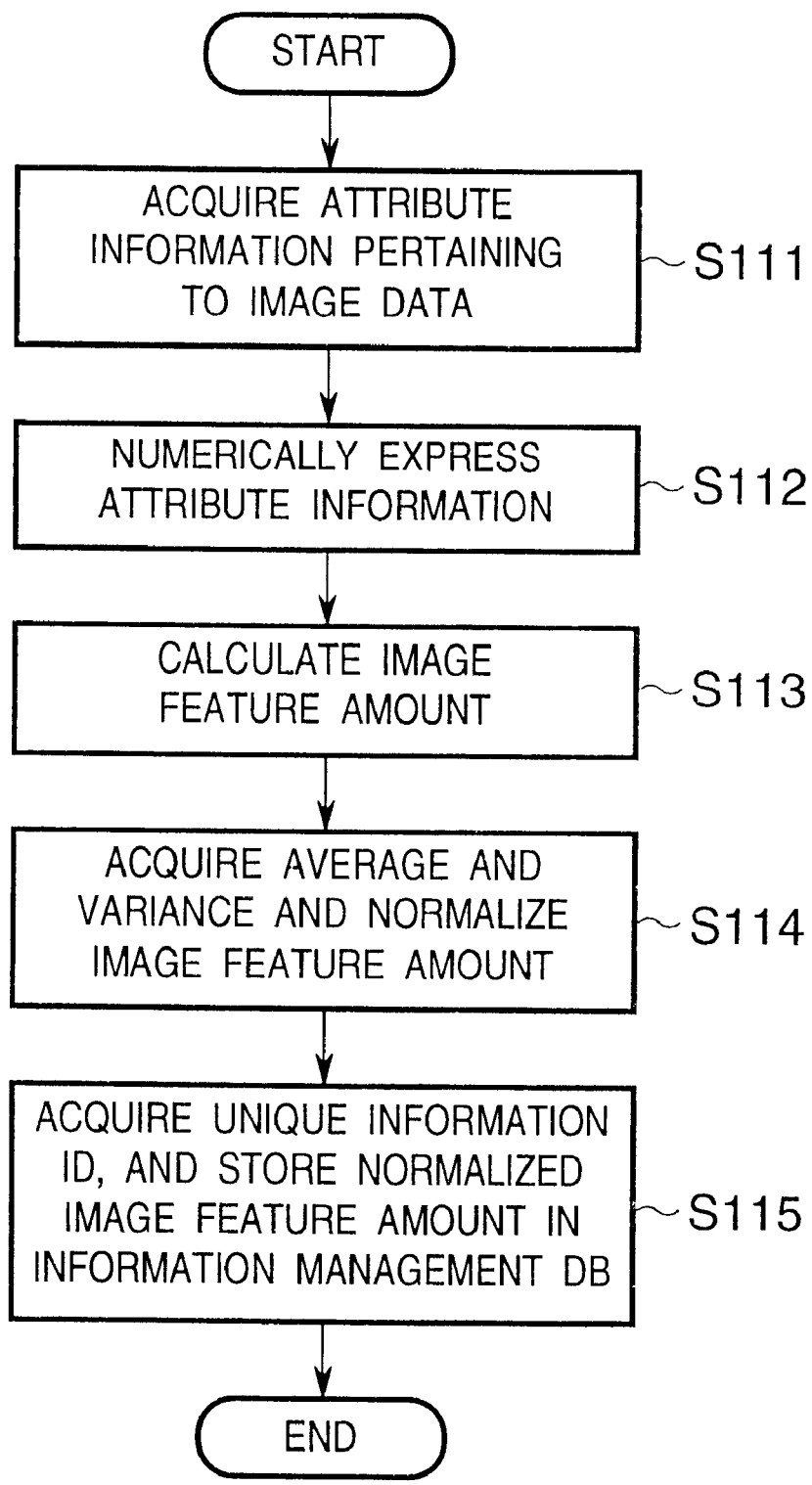
FIG. 13 is a flow chart showing an image data registration process executed in the second embodiment.

FIG. 13 is a flow chart showing the image data registration process executed in the second embodiment.

In step S111, attribute information of input image data is acquired. In step S112, the acquired attribute information is numerically expressed. This numerical expression is achieved using a predetermined formula or conversion table. In step S113, the image feature amounts of the input image data are computed. In step S114, data (average and variance) for normalizing the image data are acquired from the storage area of the system, and the image feature amounts are normalized on the basis of the acquired data. In step S115, an information ID that indicates the input image data, the normalized image feature amounts, the acquired attribute information, and an information storage address indicating the location where that image data is actually managed are stored in the information management DB 7 in correspondence with each other in, e.g., a format shown in FIG. 3.

The search process for searching for image data will be explained below using FIG. 14.

Figure 14:
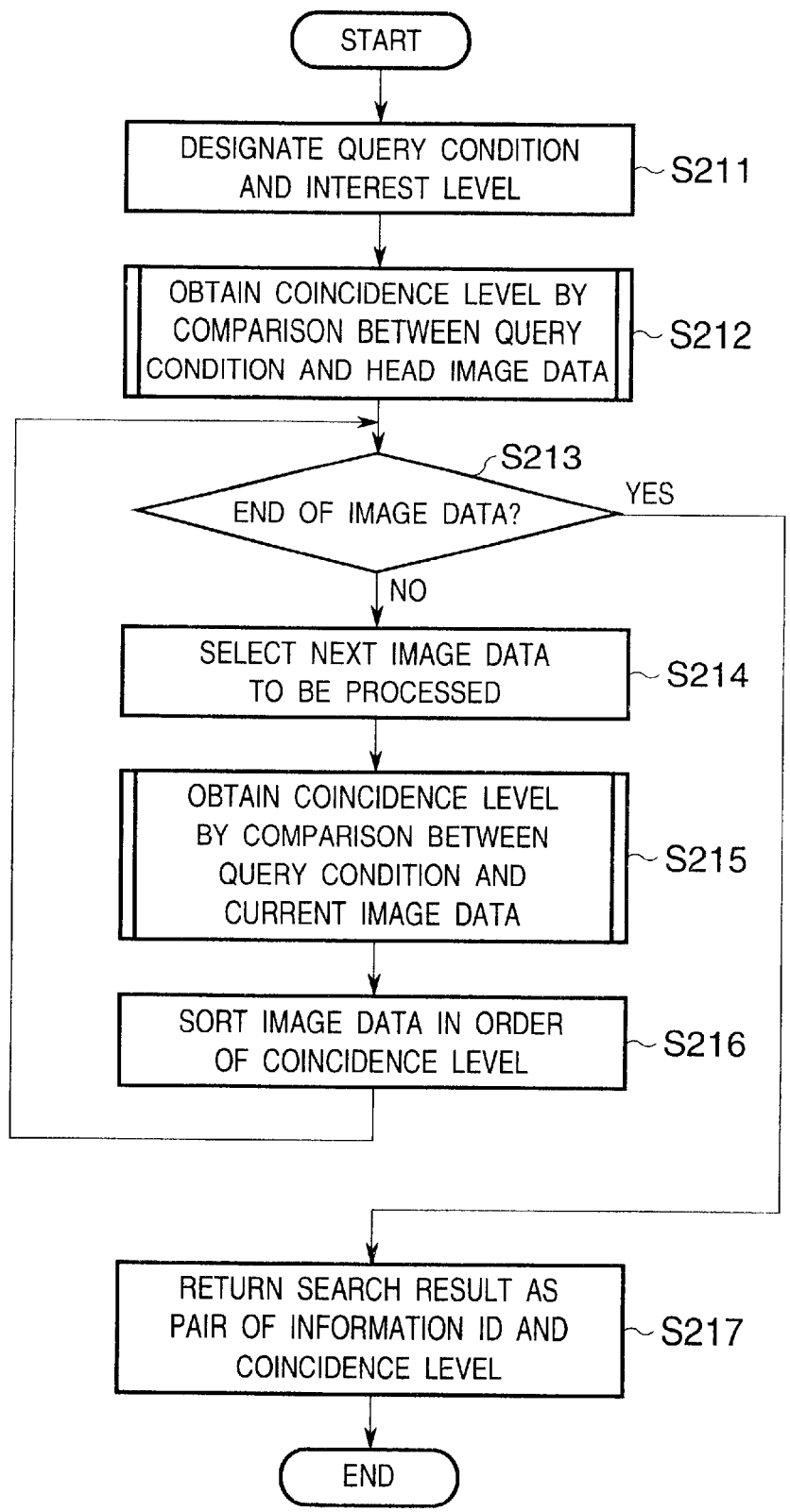
FIG. 14 is a flow chart showing an image data search process executed in the second embodiment.

FIG. 14 is a flow chart showing the image data search process executed in the second embodiment.

In step S211, attribute information and an image feature amount are designated as a query condition, and their interest levels are designated.

Note that this step assumes that "matching with a large ambiguity level with respect to a small numerical value (interest level) corresponding to a weight for attribute information or an image feature amount is effective and complies with the user's will". In this way, the interest levels designate weights for the attribute information and image feature amount, and designate the ambiguity of matching of the attribute information and image feature amount. That is, as the attribute information and image feature amounts have larger weights, the ambiguity level upon matching is decreased; conversely, as the attribute information and image feature amounts have smaller weights, the ambiguity level upon matching is increased.

Figure 15:
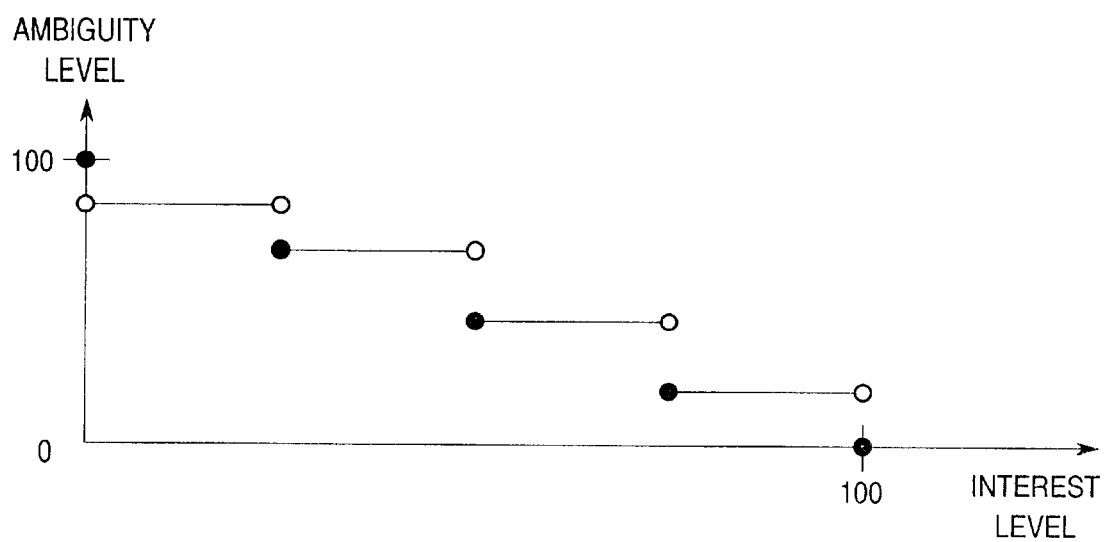
FIG. 15 is a graph showing an example of a discrete function which expresses the correspondence between the interest level and ambiguity level in the second embodiment.
Figure 16:
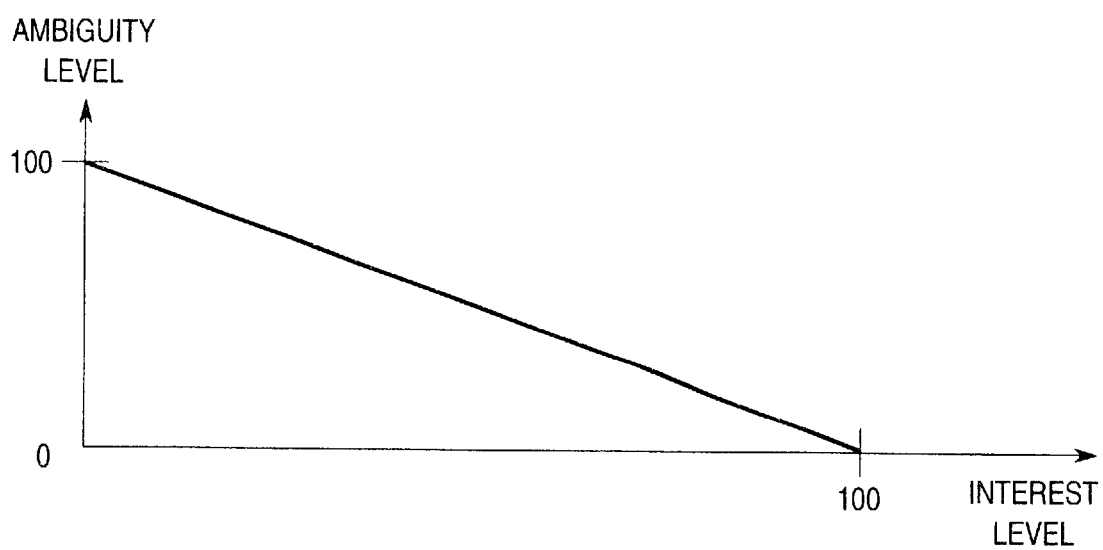
FIG. 16 is a graph showing an example of a continuous function which expresses the correspondence between the interest level and ambiguity level in the second embodiment.

Upon realizing the aforementioned relationship, if the ambiguity level is a discrete one, a "function that describes correspondence between the interest level and ambiguity level" shown in FIG. 15 is used. On the other hand, if the ambiguity level is a continuous one, a "monotonously decreasing function that describes correspondence between the interest level and ambiguity level" shown in FIG. 16 is used. The functions shown in FIGS. 15 and 16 are not particularly limited as long as they are monotonously decreasing functions.

As the query condition, coordinates on the same normalized multi-dimensional image feature space as that upon registration are given. For example, when image data similar to a given image is to be retrieved, the normalized image feature amount of that image data is given.

In step S212, the attribute information and normalized image feature amounts (to be also referred to normalization parameters hereinafter as a whole) that define the designated query condition are matched with those of image data stored at the head of the image storage unit 4 by the matching unit 3a on the basis of the designated interest levels. More specifically, matching between the normalized parameters is done according to the ambiguity level obtained based on the interest level, and the matching result is determined as similarity of the normalization parameter of interest. The computation formula of similarity may be changed or constraint condition may be made stricter or weaker in correspondence with the ambiguity level. Using the obtained similarities in units of normalization parameters, a coincidence level L between the normalized image feature amount of image data to be processed and the one which defines the query condition is computed. The coincidence level L can be computed by:

$$L = \frac{\sum_{i=1}^{k} \{Wi \times Si(Fi(Wi), Ri, Pi)\}}{\sum_{i=1}^{k} Wi} \quad (4.0)$$

where
  i: an identifier of the image feature amount;
  k: the number of types of normalization parameters;
  Pi: a normalization parameter;
  Ri: a comparison reference parameter (the normalization parameter of image data to be matched);
  Wi: the interest level for the normalization parameter i;
  Fi(Wi): a function of converting the interest level for the image feature amount i into the ambiguity level; and
  Si(Fi, Ri, Pi): a function of obtaining similarity between the comparison reference parameter Ri and normalization parameter Pi in consideration of the ambiguity level Fi for the image feature amount i.

The process for obtaining the coincidence level L in step S212 will be described in detail below with reference to FIG. 17.

Figure 17:
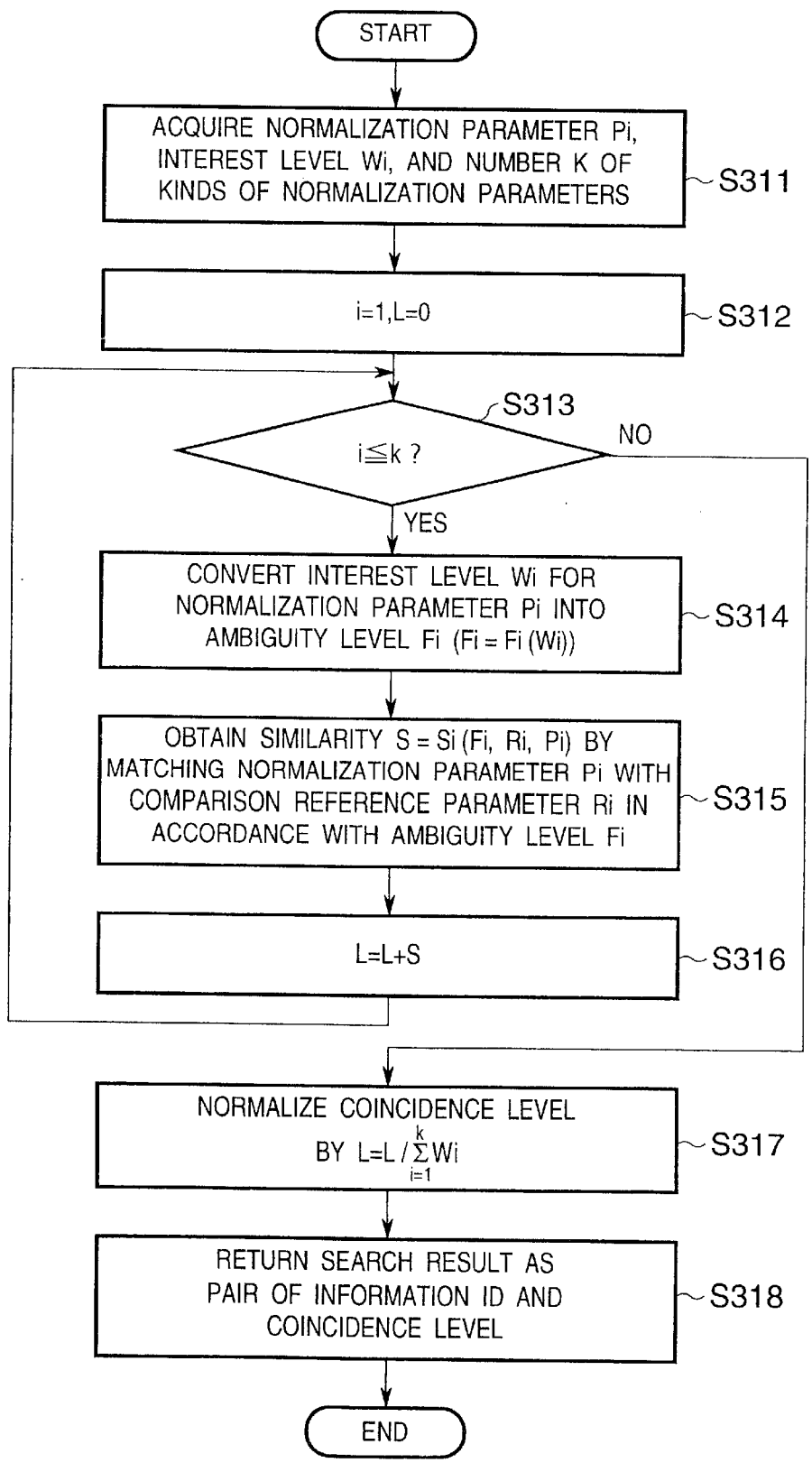
FIG. 17 is a flow chart showing the details of the process executed in step S212 in FIG. 14 in the second embodiment.

FIG. 17 is a flow chart showing the details of the process executed in step S212 in FIG. 14 in the second embodiment.

In step S311, normalization parameters Pi that define the query condition, their interest levels Wi, and the number k of kinds of normalization parameters are acquired. In step S312, the value of counter i for counting the normalization parameters that have undergone matching is set at 1, and the value (coincidence level) of register L is set at 0. It is checked in step S313 if the value of counter is equal to or smaller than the number k of kinds of normalization parameters. If the value of counter i is equal to or smaller than the number k of kinds of normalization parameters (YES in step S313), the flow advances to step S304, and the interest level Wi for the normalization parameter Pi is converted into an ambiguity level Fi using Fi=Fi(Wi). In step S135, matching between the normalization parameter Pi and comparison reference parameter Ri is done in accordance with the ambiguity level Fi to obtain similarity S=Si(Fi, Ri, Pi). The obtained similarity S is added to the current value of register L.

On the other hand, if the value of counter i is larger than the number k of kinds of normalization parameters (NO in step S313), the flow advances to step S317, and the sum total of similarities Si is divided by the value of register L to obtain a normalized coincidence level L. In step S318, a pair of obtained coincidence level L and the information ID of image data to be matched are output as a search result.

The following description will be given referring back to FIG. 14.

It is checked in step S213 if image data to be matched are exhausted. If image data to be matched are exhausted (YES in step S213), the flow advances to step S217, and pairs of information IDs of image data and the coincidence levels L with the query condition are output to the display 9a as search results. On the other hand, if image data to be matched are not exhausted (NO in step S213), the flow advances to step S214 to select the next image data to be matched.

In step S215, matching between the normalization parameter that define the query condition and that of the selected image data is done by the matching unit 3a. Since the details of this process are the same as those in step S212, a detailed description thereof will be omitted. In step S216, image data that have finished matching in the matching unit 3a are sorted on the basis of the obtained coincidence levels L, and the flow returns to step S213. If it is determined in step S213 that image data to be matched are exhausted, the flow advances to step S217, and the pairs of information IDs of image data and the coincidence levels L with the query condition are output to the display 9a as search results in descending order of coincidence level L.

In the aforementioned search process, presearch may be done. That is, image data having coincidence levels equal to or larger than a predetermined value are extracted in advance in units of image feature amounts, and the search process is executed for those extracted image data under the actually designated query condition. In this case, similarities Si(Wi) for all normalization parameters are not always obtained. In such case, as for similarities Si(Fi, Ri, Pi) corresponding to normalization parameters i that have been excluded by the presearch, a minimum similarity value Min(Si) of the remaining search results after the presearch is used in place of Si(Fi, Ri, Pi). The search process including the presearch will be explained below with reference to FIG. 18.

Figure 18:
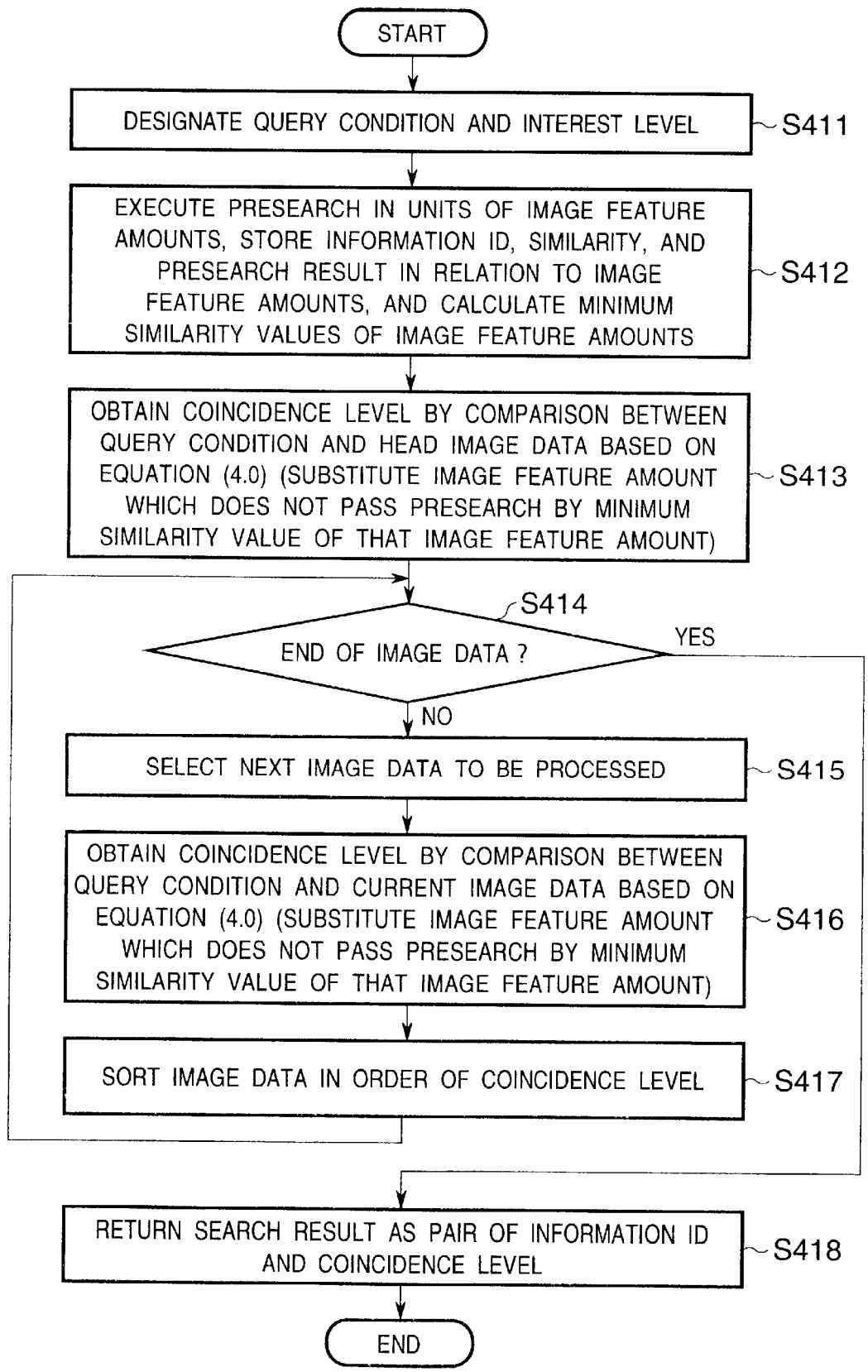
FIG. 18 is a flow chart showing the search process including presearch executed in the second embodiment.

FIG. 18 is a flow chart showing the search process including presearch executed in the second embodiment.

In step S411, attribute information and image feature amounts are designated as a query condition, and their interest levels are designated. In step S412, matching with normalization parameters of image data stored in the image storage unit 4 is done as presearch by the matching unit 3a in units of normalization parameters that define the selected query condition. Then, results indicating passing or not the presearch, information IDs, and similarities are stored in units of image data, and the minimum similarity values of the individual normalization parameters are stored.

In step S413, computations given by equation (4.0) above are made for the respective normalization parameters of image data stored at the head of the image storage unit 4 to obtain a coincidence level L with the query condition. However, if normalization parameter j does not pass the presearch, the minimum similarity value of normalization parameter j stored in step S412 is substituted in terms i=j in equation (4.0). In this way, any computation results for the individual normalization parameters lost in the presearch can be compensated for, and matching can be done.

It is checked in step S414 if image data to be processed, i.e., those which are to undergo computations given by equation (4.0) are exhausted. If image data to be processed are exhausted (YES in step S414), the flow advances to step S418, and pairs of information IDs of image data and the coincidence levels L with the query condition are output to the display 9a as search results. On the other hand, if image data to be matched are not exhausted (NO in step S414), the flow advances to step S415 to select the next image data to be processed.

In step S416, computations given by equation (4.0) above are made for the respective normalization parameters of the selected image data to obtain a coincidence level L with the query condition. In step S417, image data that have been processed are sorted on the basis of the obtained coincidence levels L, and the flow then returns to step S414. If it is determined in step S414 that image data to be processed are exhausted, the flow advances to step S418, and pairs of information IDs of image data and coincidence levels L with the query condition are output to the display 9a as search results in descending order of coincidence level L.

An example of the aforementioned registration process and search process will be explained below.

In this example, image data which is expressed by 32-bit R, G, and B values, and has a figure painted in white will be exemplified as that to be registered in the registration process.

In the registration process, as described above, the attribution information of image data to be registered is acquired, and its image feature amounts are computed. In this case, in order to obtain an image feature amount by numerically expressing the attribute information, the color indicated by RGB values of image data is numerically expressed using a conversion table shown in FIG. 19. Also, the area of a composition indicated by the painted figure of the image data is computed and is determined as an image feature amount.

Then, data for normalizing these image feature amounts are acquired from the table shown in FIG. 10 to obtain normalized feature amounts X, which are normalized by:

$$\text{normalized image feature amount } X=(\text{image feature amount}-\text{average})/\text{variance} \qquad (5.0)$$

When the image feature amount obtained by numerically expressing the color indicated by the actual RGB values and the image feature amount indicated by the composition are normalized, they are stored in the information management DB 7.

Figure 20:
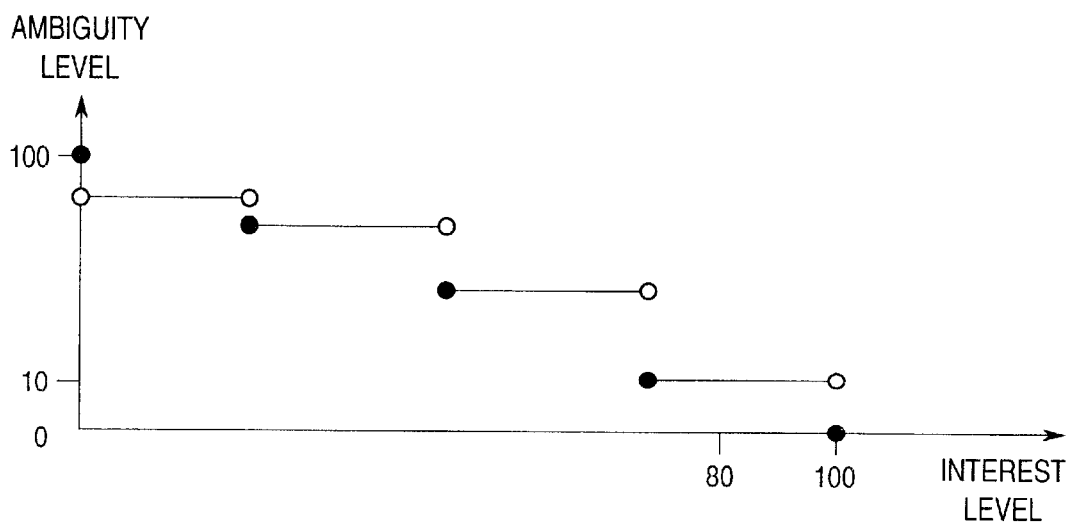
FIG. 20 is a graph showing an example of a discrete function that expresses the correspondence between the interest level and ambiguity level of an image feature amount indicated by a color in the second embodiment.
Figure 21:
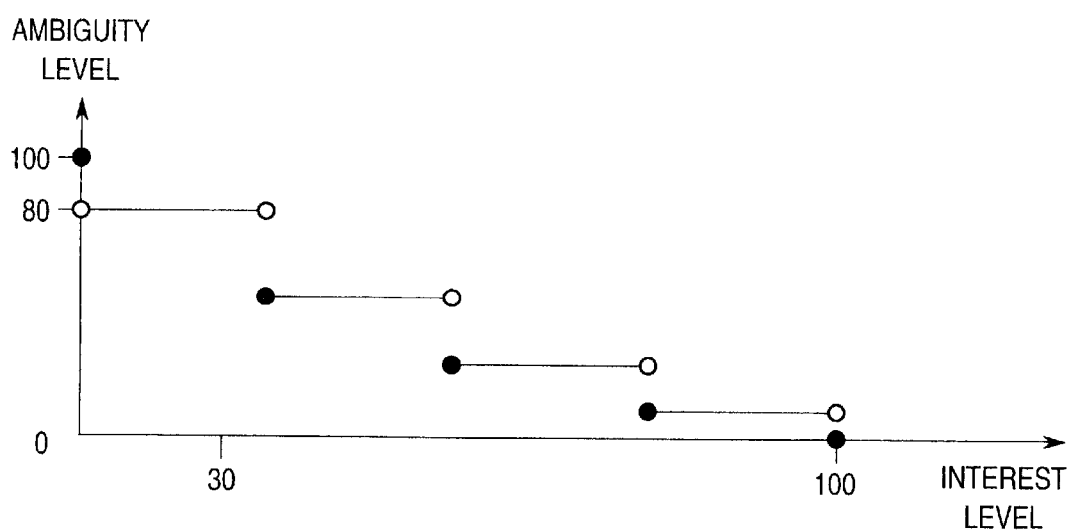
FIG. 21 is a graph showing an example of a discrete function that expresses the correspondence between the interest level and ambiguity level of an image feature amount indicated by a composition area in the second embodiment.

The search process will be explained below. Assuming that the interest level of the image feature amount indicated by color is 70%, the interest level of the image feature amount indicated by the area of the composition is 30%, and arbitrary image data is designated from the information management DB 7. Note that of the image feature amounts of the designated image data, an image feature amount obtained by color is 65, and the image feature amount indicated by the area of the composition is 20. The interest level of the image feature amount indicated by color is converted into an ambiguity level using a discrete function shown in FIG. 20. Also, the interest level of the image feature amount indicated by the area of the composition is converted into an ambiguity level using a discrete function shown in FIG. 21. In this case, the ambiguity level of the image feature amount indicated by the color is 10, and that of the image feature amount which pertains to the area of the composition is 80.

When a coincidence level with the search target image is computed according to equation (4.0) above using these results, since the number k of kinds of image feature amounts (normalization parameters)=2, equation (4.0) can be rewritten as:

$$L=70\times S1(10, 65, P1)+30\times S2(80, 20, P2)\} \quad (6.0)$$

Note that the first term (S1(10, 65, P1)) in equation (6.0) computes similarity between the image feature amount 65 for the ambiguity level 10 and P1 in pattern matching that pertains to the color. Likewise, the second term (S2(80, 20, P2)) in equation (6.0) computes similarity between image feature amount 20 for ambiguity level 80, and P1.

In the similarity computations, a formula or algorithm suitable for an ambiguity level is used for each image feature amount.

The aforementioned process is done for all search target image data, and image data are sorted and displayed as search results on the display 9a in descending order of coincidence level L. When search results are returned to a host application, or are represented by a distance in place of the coincidence level L, the distance can be converted via a function that describes correspondence between the distance and coincidence level, and that function is a monotonously decreasing function.

When the search process including presearch is executed, if the difference between the image feature amount indicated by color and the color of the corresponding image feature amount of image data to be processed falls within a predetermined range, or if the ratio of the image feature amount indicated by the composition to the area of the composition of the corresponding image feature amount of the image data to be processed falls within a predetermined range, it is determined that the image feature amount passes the presearch. For each image data to be processed, the result indicating passing or not the presearch, information ID, and similarity are stored, and the minimum similarity values of the respective image feature amounts (normalization parameters), i.e., the minimum values of the first and second terms of equation (6.0) are stored.

After that, all image data undergo computations given by equation (6.0) to obtain coincidence levels L with the query condition. In this case, image data are sorted in descending order of coincidence level L. In image data for which the image feature amount indicated by the color does not pass the presearch, the minimum value of the first term stored in advance is used in the first term in equation (6.0). On the other hand, in image data for which the image feature amount indicated by the composition does not pass the presearch, the minimum value of the second term stored in advance is used in the second term in equation (6.0).

As described above, according to the second embodiment, the interest level of the image feature amount suitable for the search purpose can be designated, and since the designated interest level is converted into an ambiguity level, an ambiguity level for the image feature amount suitable for the search purpose can be set.

In the second embodiment, matching between the normalization parameter of the query condition, and that of search target image data is done to obtain their coincidence level L. Alternatively, each normalization parameter may undergo multivariate analysis to obtain its major component axis, the number of dimensions may be reduced to the number of effective major components, and matching may be done on a major component space of the reduced number of dimensions. In this case, the ambiguity level of an image feature amount (normalization parameter) must be determined depending on the major component axis. In most cases, the major component axis often becomes an axis that physically and conceptually has a given meaning, and weighting on such major component axis is more effective than in this embodiment.

In the second embodiment, the coincidence level L between the normalization parameter that defines the query condition, and that of search target image data is computed using equation (4.0) that pays attention to similarity, but an algorithm that pays attention to distance may be used. In this case, a total distance Diff corresponding to equation (4.0) is given by:

$$L = \frac{\sum_{i=1}^{k}\left\{\left(\sum_{j=1, j=1}^{k} Wj\right) \times Di(Fi(Wi), Ri, Pi)\right\}}{\sum_{i=1}^{k} Wi} \quad (7.0)$$

where
i: an identifier of the image feature amount;
k: the number of types of normalization parameters;
Pi: a normalization parameter;
Ri: a comparison reference parameter (the normalization parameter of image data to be matched);
Wi: the interest level for the normalization parameter i;
Fi(Wi): a function of converting the interest level for the image feature amount i into the ambiguity level; and
Di(Fi, Ri, Pi): a function of obtaining similarity between the comparison reference parameter Ri and normalization parameter Pi in consideration of the ambiguity level Fi for the image feature amount i.

Since the distance Diff is roughly inversely proportional to the coincidence level L, this fact must be taken into consideration if the aforementioned process is done using this distance.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus for managing image data, and searching the managed image data for desired image data, comprising:

management means for managing image data and image feature amounts thereof in correspondence with each other;

display means for displaying a query condition list comprising a plurality of query conditions defined by the image feature amounts, wherein each of the plurality of query conditions is a character string which expresses contents of an ambiguity level set for the image feature amount, wherein the character strings and the ambiguity level are stored in a storage medium in correspondence with each other;

matching means for matching the image feature amounts that define the query condition designated by a user designation operation for selecting a desired one of the plurality of query conditions in the query condition list, with corresponding image feature amounts of image data managed by said management means; and output means for outputting image data as search results on the basis of matching results of said matching means.

2. The apparatus according to claim 1, wherein said matching means matches the image feature amounts which define the query condition with the corresponding image feature amounts of the image data using an evaluation formula.

3. The apparatus according to claim 2, wherein the query condition changes the evaluation formula or coefficients used in the evaluation formula.

4. The apparatus according to claim 1, wherein said output means sorts and outputs image data as search results on the basis of coincidence levels of the image feature amounts obtained as matching results of said matching means.

5. The apparatus according to claim 1, wherein said matching means comprises extraction means for extracting in advance image feature amounts of image data, which have a coincidence level not less than a predetermined value, in units of image feature amounts that define the query condition, and said matching means matches the image feature amounts of image data extracted by said extraction means with the image feature amounts which define the query condition.

6. The apparatus according to claim 5, wherein a minimum one of coincidence levels of image data extracted by said extraction means is set as a coincidence level of image data which are not extracted by said extraction means.

7. An image search method for managing image data, and searching the managed image data for desired image data, comprising:

a management step of managing image data and image feature amounts thereof in a storage medium in correspondence with each other;

a display step of displaying a query condition list comprising a plurality of query conditions defined by the image feature amounts, wherein each of the plurality of query conditions is a character string which expresses contents of an ambiguity level set for the image feature amount, wherein the character strings and the ambiguity level are stored in a storage medium in correspondence with each other;

a matching step of matching the image feature amounts that define the query condition designated by a user designation operation for selecting a desired one of the plurality of query conditions in the query condition list, with corresponding image feature amounts of image data managed in the storage medium; and an output step of outputting image data as search results on the basis of matching results in the matching step.

8. The method according to claim 7, wherein the matching step includes the step of matching the image feature amounts which define the query condition with the corresponding image feature amounts of the image data using an evaluation formula.

9. The method according to claim 8, wherein the query condition changes the evaluation formula or coefficients used in the evaluation formula.

10. The method according to claim 7, wherein the output step includes the step of sorting and outputting image data as search results on the basis of coincidence levels of the image feature amounts obtained as matching results in the matching step.

11. The method according to claim 7, wherein the matching step comprises the extraction step of extracting in advance image feature amounts of image data, which have a coincidence level not less than a predetermined value, in units of image feature amounts that define the query condition, and the matching step includes the step of matching the image feature amounts of image data extracted in the extraction step with the image feature amounts which define the query condition.

12. The method according to claim 11, wherein a minimum one of coincidence levels of image data extracted in the extraction step is set as a coincidence level of image data which are not extracted in the extraction step.

13. A computer readable memory that stores program codes of an image search process for managing image data, and searching the managed image data for desired image data, comprising:

a program code of the management step of managing image data and image feature amounts thereof in a storage medium in correspondence with each other, wherein each of the image feature amounts is set with an ambiguity level;

a program code of the display step of displaying a query condition list comprising a plurality of query conditions defined by the image feature amounts, wherein each of the plurality of query conditions is a character string which expresses contents of the ambiguity level set for the image feature amount;

a program code of the matching step of matching the image feature amounts that define the query condition designated by a user designation operation for selecting a desired one of the plurality of query conditions in the query condition list, with corresponding image feature amounts of image data managed in the storage medium; and a program code of the output step of outputting image data as search results on the basis of matching results in the matching step.

14. An image search apparatus for managing image data, and searching the managed image data for desired image data, comprising:

management means for managing image data and image feature amounts thereof in correspondence with each other;

designation means for designating the image feature amounts and interest levels for the image feature amounts as a query condition used in a search of image data;

matching means for matching the image feature amounts that define the query condition designated by said designation means, with corresponding image feature amounts of image data managed by said management means, on the basis of the interest levels;

output means for outputting image data as search results on the basis of matching results of said matching means, wherein the interest level is a weight corresponding to importance levels to be attached to the image feature amounts, and wherein an ambiguity level of matching by said matching means is increased as the interest level has a smaller value and the ambiguity level of matching by said matching means is decreased as the interest level has a larger value.

15. The apparatus according to claim 14, wherein said designation means has a user interface for designating numerical values corresponding to the interest levels, and said matching means converts the interest levels designated via said user interface into ambiguity levels upon matching, and matches the image feature amounts that define the query condition, with the corresponding image feature amounts of the image data using an evaluation formula based on the ambiguity levels.

16. The apparatus according to claim 14, wherein said output means sorts and outputs image data as search results on the basis of coincidence levels of the image feature amounts obtained as matching results of said matching means.

17. The apparatus according to claim 16, wherein the coincidence level is a normalized coincidence level obtained by dividing by a sum total of the interest levels of the image feature amounts.

18. The apparatus according to claim 14, wherein said matching means comprises extraction means for extracting in advance image feature amounts of image data, which have a coincidence level not less than a predetermined value, in units of image feature amounts that define the query condition, and image feature amounts, and wherein said matching means matches the image feature amounts of image data extracted by said extraction means, with the image feature amounts which define the query condition.

19. The apparatus according to claim 18, wherein a minimum one of coincidence levels of image data extracted by said extraction means is set as a coincidence level of image data which are not extracted by said extraction means.

20. An image search method for managing image data, and searching the managed image data for desired image data, comprising:

a management step of managing image data and image feature amounts thereof in a storage medium in correspondence with each other;

a designation step of designating the image feature amounts and interest levels for the image feature amounts as a query condition used in a search of image data;

a matching step of matching the image feature amounts that define the query condition designated in the designation step, with corresponding image feature amounts of image data managed in the storage medium in the management step, on the basis of the interest levels; and an output step of outputting image data as search results on the basis of matching results in the matching step, wherein the interest level is a weight corresponding to importance levels to be attached to the image feature amounts, and wherein an ambiguity level of matching by said matching means is increased as the interest level has a smaller value and the ambiguity level of matching by said matching means is decreased as the interest level has a larger value.

21. The method according to claim 20, wherein the designation step has a user interface for designating numerical values corresponding to the interest levels, and wherein the matching step includes the step of converting the interest levels designated via said user interface into ambiguity levels upon matching, and matching the image feature amounts that define the query condition, with the corresponding image feature amounts of the image data, using an evaluation formula based on the ambiguity levels.

22. The method according to claim 20, wherein the output step includes the step of sorting and outputting image data as search results on the basis of coincidence levels of the image feature amounts obtained as matching results in the matching step.

23. The method according to claim 22, wherein the coincidence level is a normalized coincidence level obtained by dividing by a sum total of the interest levels of the image feature amounts.

24. The method according to claim 20, wherein the matching step comprises the extraction step of extracting in advance image feature amounts of image data, which have a coincidence level not less than a predetermined value, in units of image feature amounts that define the query condition, and image feature amounts, and the matching step includes the step of matching the image feature amounts of image data extracted in the extraction step with the image feature amounts which define the query condition.

25. The method according to claim 24, wherein a minimum one of coincidence levels of image data extracted in the extraction step is set as a coincidence level of image data which are not extracted in the extraction step.

26. A computer readable memory that stores program codes of an image search process for managing image data, and searching the managed image data for desired image data, comprising:

a program code of the management step of managing image data and image feature amounts thereof in a storage medium in correspondence with each other;

a program code of the designation step of designating the image feature amounts and interest levels for the image feature amounts as a query condition used in a search of image data;

a program code of the matching step of matching the image feature amounts that define the query condition designated in the designation step, with corresponding image feature amounts of image data managed in the storage medium in the management step, on the basis of the interest levels;

a program code of the output step of outputting image data as search results on the basis of matching results in the matching step, wherein the interest level is a weight corresponding to importance levels to be attached to the image feature amounts, and wherein an ambiguity level of matching by said matching means is increased as the interest level has a smaller value and the ambiguity level of matching by said matching means is decreased as the interest level has a larger value.

* * * * *

UNITED STATES PATENT AND TRADEMARK OFFICE
CERTIFICATE OF CORRECTION

PATENT NO.     : 6,567,551 B2
DATED          : May 20, 2003
INVENTOR(S)    : Shiiyama It is certified that error appears in the above-identified patent and that said Letters Patent is hereby corrected as shown below:

<u>Title page,</u>
Item [56], References Cited, U.S. PATENT DOCUMENTS, the following should be inserted:
-- 5,222,157 A   6/1993   Yoneda ................... 382/306
   5,339,412 A   8/1994   Fueki ..................... 707/104
   5,933,548 A   8/1999   Morisawa ............... 382/305
   5,999,664 A   2/1999   Mahoney et al. ......... 382/305 --.

<u>Column 9,</u>
Line 6, "then-returns" should read -- then returns --.

<u>Column 13,</u>
Line 4, "S135," should read -- S315, --.

Signed and Sealed this

Twenty-third Day of March, 2004

JON W. DUDAS
*Acting Director of the United States Patent and Trademark Office*